(12) United States Patent  
Wallace et al.

(10) Patent No.: US 6,456,310 B1  
(45) Date of Patent: Sep. 24, 2002

(54) BI-CELL CHEVRONS DETECTION COLOR REGISTRATION SYSTEM FOR COLOR PRINTING

(75) Inventors: Stanley J. Wallace, Victor, NY (US); Robert M. Lofthus, Webster, NY (US); Michael D. Borton, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/734,395

(22) Filed: Dec. 11, 2000

(51) Int. Cl.[7] .................. B41J 2/385; G03G 15/01; G01D 15/06
(52) U.S. Cl. .................. 347/116; 399/49; 399/72; 399/301
(58) Field of Search .................. 399/301, 49, 60, 399/72; 347/116

(56) References Cited

U.S. PATENT DOCUMENTS

| | | | |
|---|---|---|---|
| 4,986,529 A | 1/1991 | Agarwal et al. | 271/291 |
| 5,131,649 A | 7/1992 | Martin et al. | 271/302 |
| 5,287,162 A * | 2/1994 | Jong et al. | 399/49 |
| 5,568,246 A | 10/1996 | Keller et al. | |
| 5,697,040 A | 12/1997 | Rabjohns et al. | 399/382 |
| 6,275,244 B1 * | 8/2001 | Omelchenko et al. | 346/116 |
| 6,292,208 B1 * | 9/2001 | Lofthus et al. | 347/116 X |
| 6,300,968 B1 * | 10/2001 | Kerxhalli et al. | 347/116 |

* cited by examiner

*Primary Examiner*—Susan S. Y. Lee

(57) ABSTRACT

In color printing with a color registration system for the registration of plural color images on an image bearing surface, such as a photoreceptor belt of a color printer, chevron shaped registration marks are imaged on the image bearing surface, which registration marks correspond to the color images and are sensed by a registration marks sensor as the image bearing surface moves in its process direction. The registration marks sensor has chevron shaped optical sensing areas provided by a matching pair of spaced apart elongated bi-cell detectors in a generally chevron shaped pattern. Each of these spaced apart elongated bi-cell detectors has a parallelogram shaped optical sensing area. That parallelogram shaped sensing area is defined by elongated parallelogram sides extending at the same angle as one leg of the chevron shaped registration marks, and parallelogram ends which are parallel to the process direction, so as to provide higher color registration accuracy.

3 Claims, 4 Drawing Sheets

BI-CELL CHEVRONS DETECTION COLOR REGISTRATION SYSTEM FOR COLOR PRINTING

Cross-reference and incorporation by reference is made to a commonly assigned U.S. application Ser. No. 09/662,197 (issued as U.S. Pat. No. 6,275,244 on Aug. 14, 2001), filed Sep. 14, 2000 by Mark A. Omelchenko, Robert M. Lofthus, et al, entitled "Color Printing Image Bearing Member Color Registration System", and also a priority claim, to the extent it is available, for common subject matter, in view of an Inventor in common, Robert M. Lofthus.

Disclosed is an improvement in systems for the accurate registration of images on an image bearing member of an image reproduction system, such as a xerographic printer, especially a plural color printer, relative to other such images and/or other related components of the image reproduction system. In particular, there is disclosed in the embodiment herein an improved sensor and system for the detection of registration marks on the image bearing member. For example, the detecting of chevron shaped color toner image position registration marks on a photoreceptor belt with improvements in the shape and position of the active (light sensing) areas of the sensor.

The registration system disclosed in the specific embodiment herein can be accomplished with little or no additional cost or complexity over existing such registration systems. It can be accomplished with a relatively simple modification of pre-existing registration mark-on-belt (MOB) sensors and their controls, yet provide increased fine registration accuracy.

By way of background, in various reproduction systems, including xerographic printing, the control and registration of the position of imageable surfaces such as photoreceptor belts, intermediate transfer belts (if utilized), and/or images thereon, is critical, and a well developed art, as shown by the exemplary patents cited below. It is well known to provide various single and/or dual axes control systems, for adjusting or correcting the lateral position and/or process position or timing of a photoreceptor belt or other image bearing member of a reproduction apparatus, such as by belt lateral steering systems and/or belt drive motor controls, and/or adjusting or correcting the lateral position and/or process position or timing of the placing of images on the belt with adjustable image generators such as laser beam scanners.

An important application of such accurate image position or registration systems is to accurately control the positions of different colors being printed on the same intermediate or final image substrate, to insure the positional accuracy (adjacency and/or overlapping) of the various colors being printed. That is not limited to xerographic printing systems. For example, precise registration control may be required over different ink jet printing heads and/or vacuum belt or other sheet transports in a plural color ink jet printer.

Of particular interest here, it is well known to provide image registration systems for the correct and accurate alignment, relative to one another, on both axes, of different plural color images on an initial imaging bearing surface member such as (but not limited to) a photoreceptor belt of a xerographic color printer. That is, to improve the registration accuracy of such plural color images relative to one another and/or to the image bearing member, so that the different color images may be correctly and precisely positioned relative to one another and/or superposed and combined for a composite or full color image, to provide for customer-acceptable color printing on a final image substrate such as a sheet of paper. The individual primary color images to be combined for a mixed or full color image are often referred to as the color separations.

As noted, known means to adjust the registration of the images on either or both axes (the lateral axis and/or the process direction axis) relative to the image bearing surface and one another include adjusting the position or timing of the images being formed on the image bearing surface. That may be done by control of ROS (raster output scanner) laser beams or other known latent or visible image forming systems.

In particular, it is known to provide such imaging registration systems by means of marks-on-belt (MOB) systems, in which edge areas of the image bearing belt laterally outside of its normal imaging area are marked with registration positional marks, detectable by an optical sensor. For belt steering and motion registration systems (previously described) such registration marks can be permanent, such as by silk screen printing or otherwise permanent marks on the belt, such as belt apertures, which may be readily optically detectable. However, for image position control relative to other images on the belt, or the belt position, especially for color printing, typically these registration marks are not permanent marks. Typically they are distinctive marks imaged with, and adjacent to, the respective image, and developed with the same toner or other developer material as is being used to develop the associated image, in positions corresponding to, but outside of, the image position. Such as putting the marks along the side of the image position or in the inter-image zone between the images for two consecutive prints. Such marks-on-belt (MOB) image position or registration indicia are thus typically repeatedly developed and erased in each rotation of the photoreceptor belt. It is normally undesirable, of course, for such registration marks to appear on the final prints (on the final image substrate).

The above and further background, including examples of specific MOB registration sensors and controls, is well known to those skilled in this art, and taught in numerous products and patents thereon (of which the following are some examples). Thus, it need not be repeated herein in detail.

Of particular interest here, the following five Xerox Corp. U.S. patents are noted as specifically mentioning one or more registration systems utilizing "chevron" photoreceptor registration marks for color printing: U.S. Pat. Nos. 6,014,154; 5,774,156; 5,537,190; 5,418,556; and (of particular interest) U.S. Pat. No. 5,287,162, entitled "Method and Apparatus for Corrections of Color Registration Errors," issued Feb. 15, 1994 by deJong, et al., describing registration with chevrons and also bi-cell detectors or CCD detectors. The latter and other patents noted above, and other Xerox Corp. patents such as U.S. Pat. Nos. 5,748,221; 5,510,877 and 5,631,686, issued May 20, 1997 to Castelli, et al, are also relevant to MOB sensors and/or systems for image shifting into registration by ROS shifting and/or belt position shifting. Said U.S. Pat. No. 5,748,221, issued Nov. 1, 1995 to Castelli, et al, also describes chevron MOBs and bi-cells sensors.

Another MOB registration system for multicolor image registration which is disclosed as specific to intermediate image bearing belts (in addition to U.S. Pat. No. 5,287,162 above) is Fuji Xerox Co. U.S. Pat. No. 6,094,551. Also, U.S. Pat. No. 4,963,899 issued Oct. 16, 1990 to Resch, also describing bi-cell sensors.

U.S. Pat. No. 5,909,235 is of interest for noting MOB sensor registration, citation of other references here therein, and a background discussion of different applicable color printing systems, and U.S. Pat. No. 4,804,979 on MOBs.

The following exemplary U.S. patents are noted for discussions of photoreceptor or intermediate belt motion sensing with permanent belt fiducial or registration (and/or belt seam location) markings, by belt holes or other apertures, and optical sensors and/or belt steering controls: U.S. Pat. Nos. 4,837,636; 5,175,570; 5,204,620; 5,208,633; 5,248,027; 5,278,587 (on plural ROS beam sweep detections for single pass registered color printing) U.S. Pat. No. 5,383,014; and pending Xerox Corp. Ser. No. 09/450,375, filed Nov. 29, 1999 by Castelli, et al.

Of additional interest for registration of plural color images with sensed color registration marks on a belt is Xerox Corp. U.S. Pat. No. 5,384,592, issued Jan. 24, 1995 to Lam F. Wong, entitled "Method and Apparatus for Tandem Color Registration Control."

The following copending Xerox Corp. U.S. patent applications on color printer registration systems are also noted: Ser. No. 09/306,418, filed May 6, 1999, entitled "On-line Image-On-Image Color Registration Control Systems and Methods Based on Time-Scheduled Control Loop Switching" by Michael R. Furst, on a MOB sensor and control system; and Ser. No. 09/447,231, filed Nov. 23, 1999, entitled "Image Color Registration Sensor Calibration" by Olga Ramirez and Mark Omelchenko, on MOB sensor calibration algorithms, disclosing chevron MOBs; and Ser. No. 09/626,465, filed Jul. 26, 2000, entitled "Color Image Registration Based Upon Belt And Raster Output Scanner Synchronization" by Elias Panides, et al, on registering the leading edges of color images on a photoreceptor belt by ROS synchronization to belt registration holes.

As will be apparent from the above, it is generally well known in the art of reproduction systems that image registration control on an image bearing belt can be done based on MOB sensor measurements of developed marks on the belt indicative of respective image positions on that image bearing member (substrate). If desired, that can also be combined with additional sensor information from belt edge sensing and/or permanent belt marks or holes sensing. As also noted, a printer image registration controller and/or electronic front end (EFE) can utilize MOB sensor inputs to control ROS scan lines positioning on the photoreceptor (PR) surface to correct registration of the respective image positions on both axes. That is, without necessarily requiring MOB sensor interaction with, or control over, the PR drive or PR steering controls for process direction or lateral direction registration. However, such PR registration movement, instead of, or in addition to, such imaging position registration movement, can also be done if desired.

Further by way of background, the direct sensing of the surface motion of image receivers, such as photoreceptor belts or intermediate transfer belts, or other substrates, as by the system of the embodiment disclosed herein, enables more precise transport and/or image registration, for superior image quality.

By directly measuring the belt surface position with a high degree of accuracy, the sensor signals can be inputted into an agile beam imager, such as the variable imaging position ROS systems shown in FIGS. 1 and 2, to implement a printing system that can allow relaxation of motion control requirements or tolerances for the belt surface, and even potentially eliminating the need for an expensive precision belt movement rotary encoder and its circuitry.

Color registration systems for printing, as here, should not be confused with various color correction or calibration systems, involving various color space systems, conversions, or values, such as color intensity, density, hue, saturation, luminance, chrominance, or the like, as to which respective colors may be controlled or adjusted. Color registration systems, such as that disclosed herein, relate to positional information and positional correction (shifting respective color images laterally or in the process direction and/or providing image rotation and/or image magnification) so that different colors may be accurately superposed or interposed for customer-acceptable full color or intermixed color or accurately adjacent color printed images. The human eye is particularly sensitive to small printed color misregistrations of one color relative to one another in superposed or closely adjacent images, which can cause highly visible color printing defects such as color bleeds, non-trappings (white spaces between colors), halos, ghost images, etc.

In the exemplary embodiment herein there are disclosed known examples of developing "chevron" shaped registration marks on the photoreceptor (PR) belt, and sensing their positions, as taught in the above-cited and other patents and applications. Those features do not require detailed explanations herein other than for the specific improvements thereto disclosed herein. The disclosed system can otherwise desirably utilize essentially the same, existing, MOB sensor features of bi-cell photodiode chevron MOB detectors as taught in the above-cited and other patents, with low cost modifications as described herein. Therefor, only these modifications need be described and shown herein. Likewise, applications of the disclosed embodiments can utilize known or existing positional correction software and controls for ROS or other imaging position (and/or PR position) registration correction.

A specific feature of the specific embodiment disclosed herein is to provide in a plural color reproduction apparatus with a color registration system for the registration of plural color images on an image bearing surface movable in a process direction, which color registration system generates on said image bearing surface chevron shaped registration marks with oppposingly angled legs at an angle to said process direction, and which color registration system further includes at least one registration marks sensor for detecting the positions of said chevron shaped registration marks on said image bearing surface, said registration marks sensor having chevron shaped optical sensing areas with oppposingly angled legs at substantially the same opposing angles as said chevron shaped registration marks on said image bearing surface, the improvement wherein, said chevron shaped optical sensing areas of said registration marks sensor comprise a matching pair of spaced apart elongated bi-cell detectors in a generally chevron shaped pattern, each of said spaced apart elongated bi-cell detectors has a parallelogram shaped optical sensing area, and said parallelogram shape of each said bi-cell detector optical sensing area is defined by elongated parallelogram sides extending at the same angle as one said leg of said chevron shaped registration marks on said image bearing surface, and parallelogram ends which are parallel to said process direction, so as to provide higher color registration accuracy.

Further features disclosed in the embodiment herein, individually or in combination, include those wherein said image bearing surface is a photoreceptor of a xerographic printing system, and/or wherein said parallelogram shaped bi-cell detector optical sensing area is defined by two separate but directly adjacent parallelogram shaped photosensor areas of equal size.

The disclosed system may be operated and controlled by appropriate operation of otherwise conventional control systems in accordance with the descriptions herein. In particular is well known and preferable to program and execute control functions and logic for reproduction systems with software instructions for conventional microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control systems or methods may be implemented partially or fully in hardware, using standard logic circuits or single chip VLSI designs.

The term "reproduction apparatus" or "printer" as alternatively used herein broadly encompasses various printers, copiers or multifunction machines or systems, xerographic or otherwise, unless otherwise indicated or defined in a claim. The term "sheet" herein refers to a usually flimsy physical sheet of paper, plastic, or other suitable physical substrate for images, whether precut or web fed. A "copy sheet" may be abbreviated as a "copy" or called a "hardcopy". A "print job" is normally a set of related sheets, usually one or more collated copy sets copied from a set of original document sheets or electronic document page images, from a particular user, or otherwise related.

As to specific components of the subject apparatus or methods, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for teachings of additional or alternative details, features, and/or technical background. What is well known to those skilled in the art need not be described herein.

Various of the above-mentioned and further features and advantages will be apparent to those skilled in the art from the specific apparatus and its operation or methods described in the example below, and the claims. Thus, the present invention will be better understood from this description of this specific embodiment, including the drawing figures (which are approximately to scale, unless indicated otherwise) wherein areas in color are cross-hatched with the corresponding official U.S. PTO cross-hatching color codes:

Figure 1:
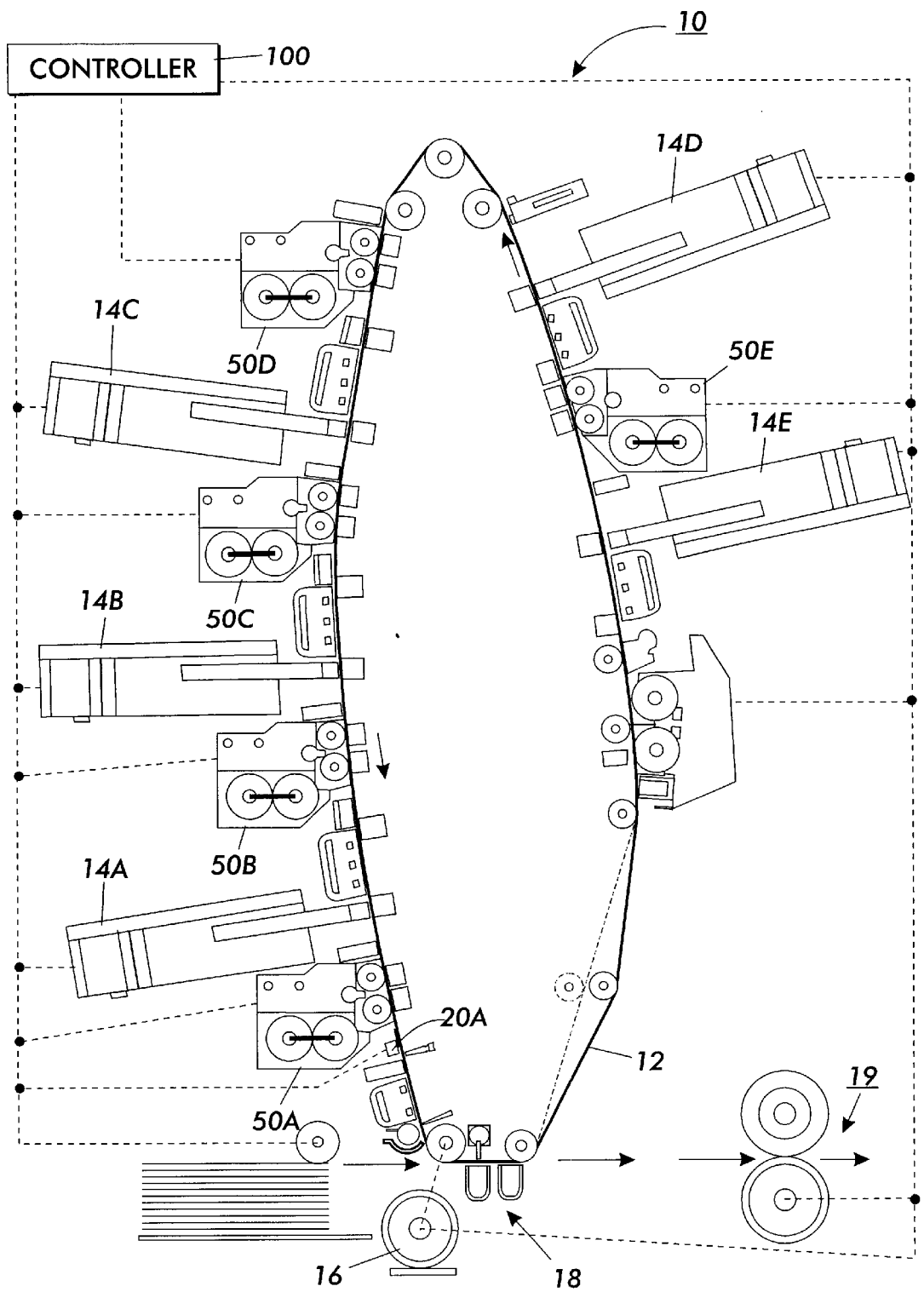
FIG. 1 is a schematic frontal view of one example of a reproduction system (a color-on-color xerographic printer) incorporating one example of the subject improved chevron MOB detector registration system.
Figure 2:
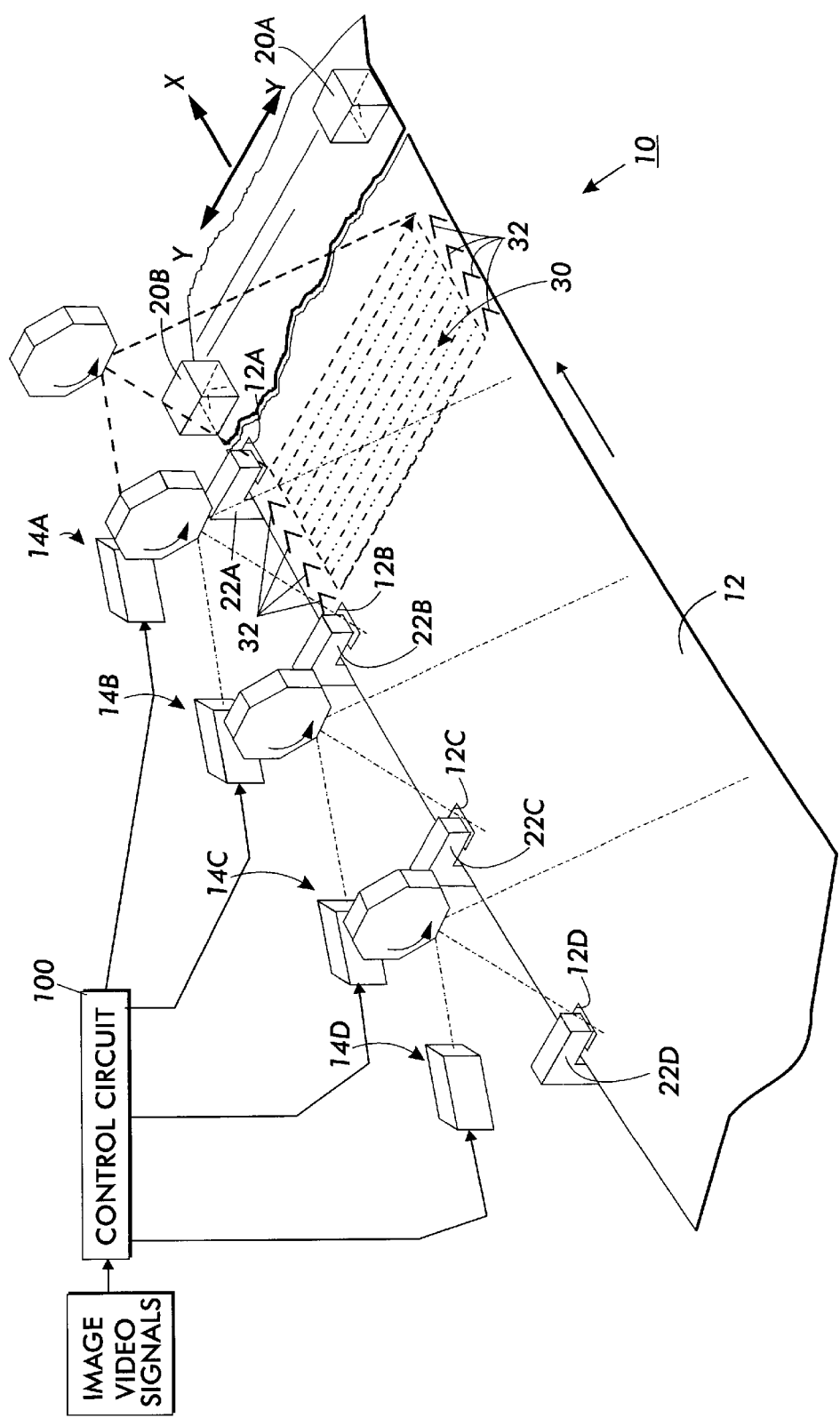
FIG. 2 is a simplified schematic perspective view of part of the embodiment of FIG. 1 for better illustrating exemplary sequential ROS generation of plural color latent images and associated exemplary latent image chevron registration marks for MOB sensing (with development stations, etc., removed for illustrative clarity, and not to scale)
Figure 3:
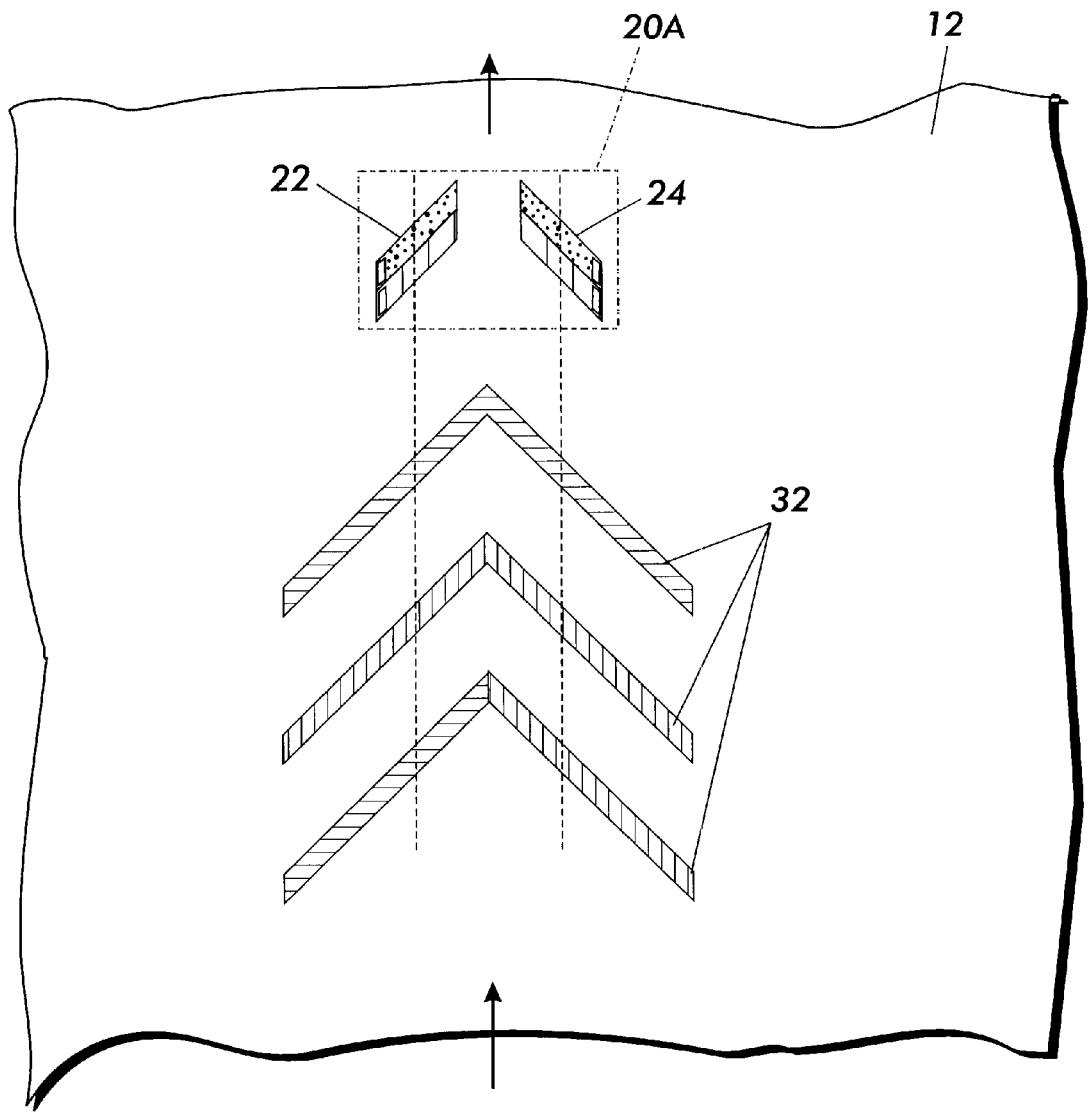
Figure 4:
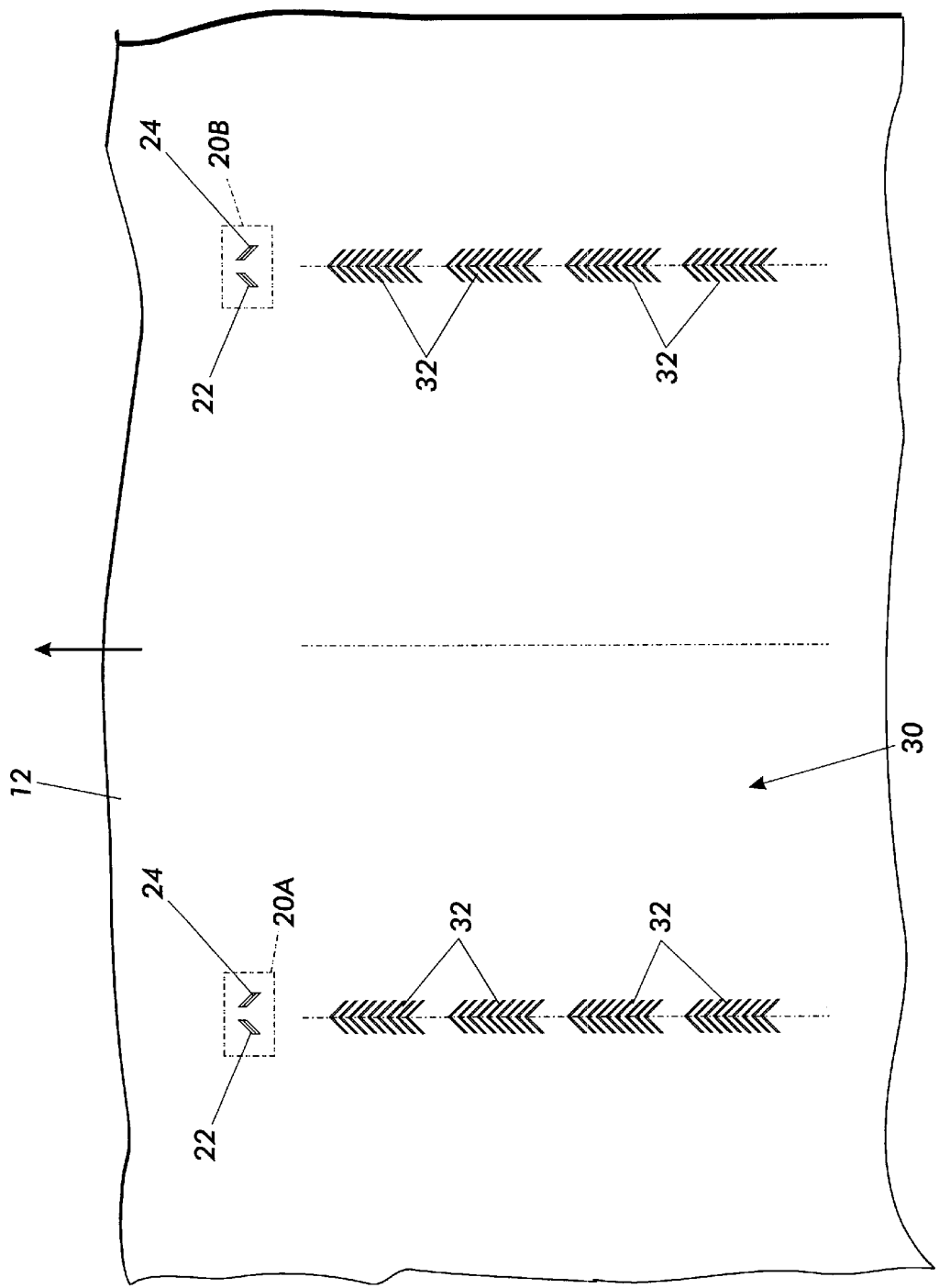

FIG. 3 is a greatly enlarged partial plan view of exemplary chevron registration developed marks on the photoreceptor belt of FIGS. 1 and 2, cross-hatched for different colors, as the chevrons are about to be moved in the process direction of the photoreceptor under an example of a MOB detector modified in accordance with the present invention; and FIG. 4 is similar to FIG. 3, but showing a full width segment of the moving photoreceptor belt of FIGS. 1, 2 and 3, with the sets of chevron targets to be detected by the subject MOB sensors on opposite sides of the belt, that is, illustrating a plurality of such targets for the different respective color images on opposite sides of an image area, and also providing for detecting image skew from the slight process direction positional differences of the opposite-side targets providing signal timing differences from the opposite side MOB sensors.

Describing now in further detail the exemplary embodiment with reference to these Figs., there is schematically shown in FIG. 1 a printer 10, merely as one example of an otherwise known type of xerographic plural color "image-on-image" (IOI) type full color (cyan, magenta, yellow and black imagers) reproduction machine, merely by way of one example of the applicability of the exemplary improved color registration system. A partial, very simplified, schematic perspective view thereof is provided in FIG. 2 for additional illustrative clarity. This particular type of color printing is also referred as "single pass" multiple exposure color printing. It has plural sequential ROS beam sweep PR image formations, and sequential superposed developments of those latent images with primary color toners, interspersed with PR belt re-charging. Further examples and details of such IOI type systems are described in U.S. Pat. Nos. 4,660,059; 4,833,503; 4,611,901; etc.

However, it will be appreciated that the disclosed improved color registration system could also be employed in non-xerographic color printers, such as ink jet printers, and/or in "tandem" xerographic or other color printing systems, typically having plural print engines transferring respective colors sequentially to an intermediate image transfer belt and then to the final substrate. For a tandem color printer it will be appreciated the image bearing member on which the subject registration marks are formed may be either or both on the photoreceptors and the intermediate transfer belt, and have MOB sensors and image position correction systems appropriately associated therewith. Various such known types of color printers are further described in the above-cited patents and need not be further discussed herein.

Turning now to the subject improvement details in this embodiment, as stated in the above cross-referenced prior application Ser. No. 09/662,197 with regard to the subject matter of this application: "Further matching of the shape of the two MOB sensor bi-cells (split photocells) to the chevrons to improve signal-to-noise properties may be desirable. That may include widening the lateral distance between the inner ends of the two bi-cells and/or shaping the area of each bi-cell as a parallelogram (rather than a rectangle), with front and back edges remaining at 45 degrees to the direction of PR travel (the process direction) but with medial and lateral edges (ends) parallel to the direction of PR travel."

To express this in other words, disclosed in this embodiment herein is improvement in the design of the Marks-on-Belt (MOB) sensor to measure color registration over those disclosed in the above-referenced patents. The changes to the MOB sensor (see especially FIG. 3 here) relate to the geometry of its pair of bi-cells, that is, both the location and shape of their active optical sensing areas. It may be seen that the two legs of the MOB sensor's two chevron shaped bi-cell sensing areas are not connected. By widening this gap between the two pairs of bi-cell detectors in the lateral or transverse direction, as shown, the "capture" range of the MOB sensor is increased. Furthermore, by changing the shape of the two active areas of each bi-cell from a rectangle to a parallelogram, each presents a common lateral edge in the process direction to sense the chevron registration mark. These changes increase the uniformity of sensor-to-chevron geometry and hence increase the signal-to-noise ratio of the MOB sensor bi-cell electrical output signals. As also shown in FIG. 3, preferably the width of each such elongated parallelogram cell (of which there are two in each bi-cell) is the same as the width of the chevron leg it is detecting.

Referring further to the exemplary printer 10 of FIGS. 1 and 2, all of its operations and functions may be controlled by programmed microprocessors, as described above, at centralized, distributed, and/or remote system-server locations, any of which are schematically illustrated here by the controller 100. A single photoreceptor belt 12 may be successively charged, ROS (raster output scanner) imaged, and developed with black and/or any or all primary colors toners by a plurality of imaging stations. In this example, these plural imaging stations include respective ROS's 14A, 14B, 14C, 14D, and 14C; and associated developer units 50A, 50B, 50C, 50D, and 50C. A composite plural color imaged area 30, as shown in FIG. 2, may thus be formed in each desired image area in a single revolution of the belt 12 with this exemplary printer 10, providing accurate registration can be obtained. Two MOB sensors (20A in FIG. 1, 20A and 20B in FIG. 2) are schematically illustrated, and will be further described herein in connection with such registration. Each MOB sensor in this example has two bi-cell optical detectors 22 and 24, at opposite 45 degree angles to the process direction, and having the above-described improved MOB sensor features, as shown in FIG. 3.

As further shown in FIG. 1, the photoreceptor belt 12 has a conventional drive system 16 for moving it in the process direction shown by its movement arrows in the various Figures. A conventional transfer station 18 is illustrated for the transfer of the composite color images to the final substrate, usually a paper sheet, which then is fed to a fuser 19 and outputted. The belt 12 may be an otherwise known or conventional organic photoreceptor belt, on which there is extensive patent and other literature, or other materials.

Referring to FIG. 2, it may be seen that fiducial or registration holes 12A, 12B, 12C, 12D, etc., (or other permanent belt marks, of various desired configurations) may also be provided along one or both edges of the photoreceptor belt 12. These holes or marks may be optically detected, such as by belt hole sensors, schematically shown in this example of FIG. 2 as 22A, 22B, 22C, 22D. Various possible functions thereof are described, for example, in the above-cited patents. In particular, coordination with the initiation of generation of the chevron MOBs. If desired, the holes or other permanent belt markings may be located, as shown, adjacent respective image areas, but it is not necessary that there be such a mark for each image position, or that there be plural sensors. Also, the number, size and spacing of the image areas along the photoreceptor belt may vary. For example, changing for larger or smaller images in the process direction for printing on larger or smaller sheets of paper.

However, as noted, the present registration system more particularly relates to producing and accurately sensing temporary imaged and toner-developed chevron shaped registration marks on the photoreceptor (MOBs) relating to the position of images being generated thereon, for registration of the different color images relative to one another and/or to the moving photoreceptor surface. Those toner marks are detected by MOB sensors such as 20A and/or 20B, to provide positional information therefrom. In FIGS. 2 and 4 it may be seen that such chevron shaped toner registration mark images 32 have been formed along both sides of the printer 10 photoreceptor belt 12, adjacent but outside of its imaged area 30 (not to scale in FIG. 2). Examples of full sets or patterns 36 (<<<<<) of different color chevrons are shown in FIG. 4. (As noted, chevrons or other such registration marks may be alternatively referred to as targets or MOBs herein.) By using such registration targets imaged along the length of the belt for each color being imaged, the lateral position, lateral magnification, and skew of each color can be measured relative to the fixed position of the MOB sensors. These new values may then be continuously updated within the controller 100, such as in a ROS interface module.

As particularly described in the above cross-referenced application, for initial gross registration there may additionally be provided some different initial color registration modes of operation. Those initial gross registration modes of operation may employ "Z" MOBs and/or expanded (greater spaced) chevrons. These initial registration steps can avoid manual initial adjustments to get the registration within the sensing and control range of the MOB sensors in both the lateral and process directions of motion of the photoreceptor belt. That is, avoiding "open loop" adjustment situations where the otherwise desired chevron registration marks are out of range and not detectable. However, such two or three different initial modes may also all use the same MOB sensors, and thus also benefit from the improvements thereto discussed above.

This initial calibration procedure of writing, developing, and measuring respective marks or targets around the belt length (the belt circumference, the process direction) may be repeated for each color. The MOB sensor error signals may be converted to position and magnification correction signal for the respective ROS in a known manner. It may be in terms of first pixel delay times and pixel clock frequencies for the ROS systems. One color, such as cyan, may be used as a calibration or base position. The PR belt rotation, and this iterative routine calibration process, may be repeated until convergence within acceptable thresholds is achieved to a preset threshold.

Referring particularly to FIGS. 3 and 4, each MOB sensor bi-cell detector area 22, 24 generates a "timestamp" signal from its detection (crossover) of the centroid region of each leg of each chevron. By comparing those timestamps, one can calculate the time differential and thus the spatial separations of individual chevrons relative to the reference color. The differences in these same sensed time signals between the two laterally spaced apart MOB sensors 20A and 20B, reading correspondingly laterally spaced targets generated by the same ROS for the same color, also provides image skew signals which can be used to generate de-skewing control signals.

The term "chevron" as referred to herein should be broadly interpreted. For example, a split color chevron may be utilized having its two legs of two different colors. The two legs of such a split color chevron will be offset from one another in the process direction until complete registration is achieved between the generation and imaging of those two different colors.

Turning to further details of the exemplary MOB sensor 20A or 20B of the Figs., it optically senses the difference in reflectance between the respective toner developed chevron marks 32 on the belt 12 and the belt surface, as described in various of the above-cited references. It will be appreciated that the invention herein is not limited to the precise or specific exemplary MOB sensor shown and described herein, or in the above-cited references. In the exemplary MOB sensor shown herein, as each toner developed chevron shaped mark-on belt pattern 36 for each color image on the belt moves under the MOB sensor, LED's in the MOB sensor illuminate that chevron 32, and the two angled legs of that chevron 32 are detected by two equally angled photodetecting bi-cells 22, 24 on each side of the MOB sensor. Each bi-cell may, for example, be two photocells with a parallelogram optical sensing coverage mounted directly side by side in each side of the MOB sensor to provide a double-width parallelogram total sensing coverage per bi-cell. That is, one bi-cell on the each side of the MOB sensor, to provide four sensing cells per MOB sensor. The two bi-cells are transversely spaced apart by a substantial portion of their elongate dimension.

The two legs of the chevron MOB 32, and the two corresponding legs of these two bi-cell detection zones 22, 24 of the MOB sensor, are desirably both angled at the same 90 degrees to one another. Thus, they are all at 45 degrees to the process direction. (See FIG. 3) As described above, matching of the shape of the sensing areas of the two MOB sensor bi-cells (split photocells) 22 and 24 to the two legs of the chevrons 32 can improve signal-to-noise properties and registration accuracy.

An example of such a cell's parallelogram shaped active area dimensions would be an approximately 2.36 mm by 0.51 mm elongated parallelogram active region. That is, 1.68 mm in lateral extent (transverse the process direction), due to its 45 degree orientation. However, it will be understood that the length of each active area is not critical. The two cells of each bi-cell may closely abut each other, with, e.g., only a 20 micrometer gap. Each bi-cell is spaced apart by approximately 2 millimeters from the mirrored bi-cell on the opposite side of the detector.

The electrical outputs of this MOB sensor are pulses which occur when the center of each chevron leg is imaged on the bi-cell pair, such that an equal area of each cell is covered by the projected chevron leg. That is, each detected chevron provides an output when it is evenly "seen" by both cells of that bi-cell, by subtracting the signal from one cell from the signal from the other cell of that bi-cell. A zero point signal is thus provided when that leg of that chevron is centered under that bi-cell. The actuation of a bi-cell by a chevron leg passing under it provides a timing signal, which may be called a "time stamp."

Although not part of this exemplary improvement, an exemplary MOB sensor may employ two IR LEDs for a MOB illumination source. The direction (orientation) of the two LED IR illuminations may be from the ends of the MOB chevron legs along the chevron legs, to avoid shadows between toner piles and minimize intensity gradients normal to the gap between the bi-cells. The MOB sensors may employ for photosensors a monolithic crystalline silicon photodiode array comprising the four above-described and illustrated detector elements. The IR illumination, which is diffusely reflected from the chevron image, may be collected by an integral lens to conventionally produce a current in these photodiodes in an unbiased photovoltaic mode that is proportional to the photodiode area and the (relatively constant) illumination intensity. A conventional current-to-voltage amplifier may convert the signal to a voltage level. Hi-pass signal filtering may be used.

Differences in the arrival times of the two opposing legs of a chevron at the two respective opposing legs (bi-cells) of a MOB sensor can be used to determine the lateral position of that chevron MOB relative to the MOB sensor. That is, the time stamp signal of one bi-cell may be compared to the time stamp signal of the other bi-cell of that same MOB sensor for a chevron 32. Thus, the difference between different color chevron lateral positions provides a MOB sensor signal as to the position of one color toner image relative to another. To express this in other words, a chevron which is not centered relative to the MOB sensor, i.e., is laterally misregistered, will have one leg of that chevron detected by one bi-cell before the other bi-cell, by an amount of time stamp difference proportional to the lateral misregistration.

As noted, two separately positioned but otherwise identical MOB sensors 20A and 20B may desirably be utilized. They may both be located between the last (final color) developer station and the image transfer station, as shown in FIG. 1. However they may be located to look at areas more central to the imaging areas. Preferably the two MOB sensors are spaced apart on opposite sides of the PR belt 12, as shown in FIG. 2, to sense chevron marks which are generated on opposite sides of the belt from the same color image area. That can desirably maximize image skew detection by maximizing time stamp differences between a chevron detected on one side of the belt relative to a chevron of the same color detected on the opposite side of the belt.

An additional optional function or utilization of MOB sensors may be to detect the position of a seam in the PR belt, or belt registration or belt seam location apertures (belt timing holes), if desired. However, other sensors may be conventionally used for that, such as 22A–22D shown in FIG. 2.

With various of the above-noted or other MOB sensor measurement output signals, it will be appreciated that various high pass filtering, averaging, and/or weighting techniques may be utilized. Also, initial calibrations, including the setting of the respective MOB sensor illumination levels, may be provided for the MOB sensors and their current or voltage levels or ranges.

It will be appreciated that in this particular example of a color reproduction machine 10 which is an image-on-image xerographic printer, that the latent and developed (toner) image for each color is directly on top of the image and toner for the previously imaged and developed colors as the PR belt moves around its path in the process direction. Thus, the chevron image generation for registration marks ROS controller software may be programmed to vary those registration marks positions in the process direction for each color, as shown, so that the registration mark for one color does not overlap the registration mark for another color, even though the images themselves may completely overlap. This need not be a large spacing distance, so that the different color chevron marks may even look like "sergeants stripes" (>>>>) for example, as shown in FIG. 4. That is, the chevrons may be relatively closely spaced, as shown, but spaced apart by un-imaged non-toner spaces sufficient for the MOB sensor to be able to count or otherwise distinguish which particular chevron for that composite image is being sensed for registration accuracy at that time.

As noted, the registration marks are desirably outside of the maximum image area. Where the printer has its images and its paper path registered to one side, as is typical, (rather than center registered) the registration marks may be towards and along the other or outside edge of the PR belt. However, as shown herein, preferably even for such an edge registered system, for maximum skew registration sensitivity and accuracy, the registration marks, and the MOB sensors for reading them, may be positioned spaced apart on opposite sides of the belt, on opposite sides of the image area.

While the embodiment disclosed herein is preferred, these are merely illustrative examples, and it will be appreciated from this teaching that various alternatives, modifications, variations or improvements therein, and different applications or utilities, may be made by those skilled in the art, which are intended to be encompassed by the following claims.

What is claimed is:

1. In a plural color reproduction apparatus with a color registration system for the registration of plural color images on an image bearing surface movable in a process direction, which color registration system generates on said image bearing surface chevron shaped registration marks with opposingly angled legs at an angle to said process direction, and which color registration system further includes at least one registration marks sensor for detecting the positions of said chevron shaped registration marks on said image bearing surface, said registration marks sensor having chevron shaped optical sensing areas with opposingly angled legs at substantially the same opposing angles as said chevron shaped registration marks on said image bearing surface, the improvement wherein:

said chevron shaped optical sensing areas of said registration marks sensor comprise a matching pair of paced apart elongated bi-cell detectors in a generally chevron shaped pattern, each of said spaced apart elongated bi-cell detectors has a parallelogram shapeed optical sensing area, and said parallelogram shape of each said bi-cell detector optical sensing area is defined by elongated parallelogram sides extending at the same angle as one said leg of said chevron shaped registration marks on said image bearing surface, and parallelogram ends which are parallel to said process direction, so as to provide higher color registration accuracy.

2. The plural color reproduction apparatus with a color registration system of claim 1, wherein said image bearing surface is a photoreceptor of a xerographic printing system.

3. The plural color reproduction apparatus with a color registration system of claim 1, wherein said parallelogram shaped bi-cell detector optical sensing area is defined by two separate but directly adjacent parallelogram shaped photosensor areas of equal size.

* * * * *